May 28, 1963 P. A. LEONARDOS 3,091,328
CONTACT LENS REMOVER AND CARRIER
Filed March 2, 1961 2 Sheets-Sheet 1
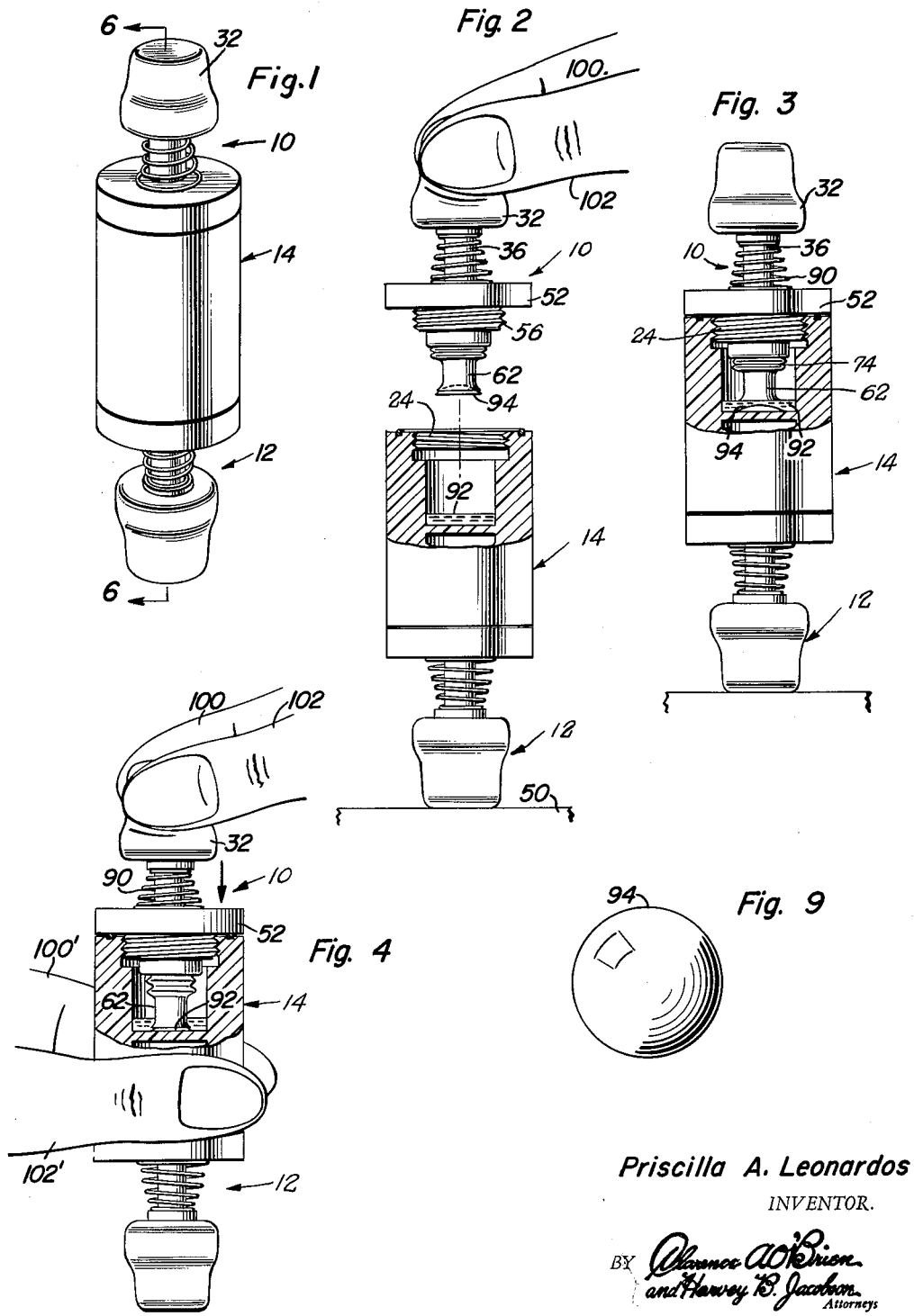
Priscilla A. Leonardos
INVENTOR.

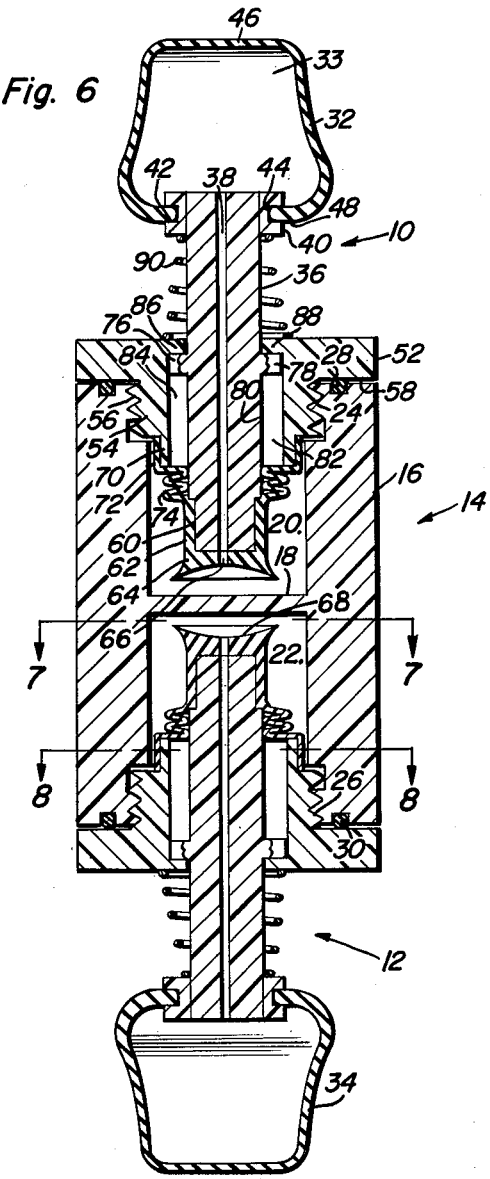

United States Patent Office 3,091,328
Patented May 28, 1963

3,091,328
CONTACT LENS REMOVER AND CARRIER
Priscilla A. Leonardos, 11 Bluebird Lane,
Atkinson, N.H.
Filed Mar. 2, 1961, Ser. No. 92,821
7 Claims. (Cl. 206—5)

This invention relates to lifting, storing and cleaning device, and more particularly to a structure for handling, storing and cleaning a contact lens for a human eye.

Briefly, the invention comprises a container divided into two separate compartments, each adapted to contain a contact lens cleaning fluid, with a contact lens submerged in the fluid. Each compartment is opened and closed by a manually removable cap having an axial bore therein. Axially slidable in each bore and extending therethrough in sealing relation thereto is a hollow sleeve spring urged in a direction outwardly of the cleaning chamber. Mounted on the inner end of each sleeve for holding and releasing a contact lens is a concave rubber disk or suction cup having a central bore therein in alignment with the bore through its sleeve. Secured to the other end of each sleeve is a compressible bulb adapted to create a pressure or suction in the hollow sleeve and at the end of the suction cup when the bulb is pressed and released respectively. By forcing the hollow sleeve and rubber cup down upon its respective contact lens and causing a suction thereon by releasing the compressed bulb at the upper end of the sleeve, the contact lens can be caused to be retained in the cup by suction, and thereby picked upwardly and inserted into position on a human eye. In a like manner by reversing the process, the contact lens can be removed from the eye and reinserted into its storage chamber.

Accordingly, it is a primary object of this invention to provide a device for storing contact lenses in a lens cleaning fluid, and also providing in the device a manually controllable means for lifting and releasing a contact lens stored in the device.

Another object of this invention is to provide a device that not only stores contact lenses for eyes, but also a device which includes features adapting it to be used for transporting a contact lens to and from the storage chamber of the device and a human eye.

It is still another object of this invention to provide a device which will pick up, transport and release a contact lens without ever necessitating any contact with the lens by human hands.

It is still another object of this invention to provide a device which will eliminate the usual awkward handling with the fingers of contact lens and to facilitate the operation of inserting, removing and cleaning the lens, and which will also function as a carrying case.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an enlarged perspective view in elevation of my invention;

FIGURE 2 is an enlarged elevational view partially in section showing my invention in use;

FIGURE 3 is a view similar to FIGURE 1 but showing my invention completely assembled with lenses therein;

FIGURE 4 is a view similar to FIGURE 3, but showing the first phase of removing a lens from the storage chamber of my invention;

FIGURE 5 illustrates how my invention is used to install a contact lens on a human eye;

FIGURE 6 is an enlarged cross sectional view taken substantially on the plane of line 6—6 of FIGURE 1;

FIGURE 7 is a cross sectional view taken substantially on the plane of line 7—7 of FIGURE 6;

FIGURE 8 is a cross sectional view taken substantially on the plane of line 8—8 in FIGURE 6; and FIGURE 9 is an enlarged front view of a typical contact lens.

Referring to FIGURES 1 and 6, it can be seen that my invention comprises three primary sub-assemblies, namely, a lens lifting assembly 10, a lens lifting assembly 12, and a storage device 14.

The storage device 14 comprises an annular sleeve 16 having a hollow bore extending axially therethrough. The bore is blocked by an annular partition 18 for forming two cylindrical chambers 20 and 22 within the sleeve 16.

The open end of each of the chambers 20 and 22 are enlarged and threaded as shown at 24 and 26. The opposite ends of the sleeve 16 have annular recesses therein which are rectangular in cross section and contain annular flexible sealing gaskets 28 and 30 which have a friction fit within the recesses.

Each of the lifting assemblies 10 and 12 are identical to one another except for the color of the bulbs 32 and 34. Preferably one bulb is colored black and the other is colored red so as to indicate that the lens in the one chamber is for the right eye and the lens in the other chamber is for the left eye. Since the lifting assemblies are otherwise identical, only one will be described in detail.

The assembly 10, for example, comprises a spring-biased plunger embodying a shaft 36 having an axial bore 38 extending longitudinally therethrough. The outer end of the shaft has an annular flange 40 fixed thereto or integral therewith which has an annular groove 42 formed in its outer peripheral surface.

The flexible bulb 32 has an annular bore 44 which is normally slightly smaller in diameter than the inner diameter of the groove 42. Normally the bulb 32 is of cylindrical shape and has parallel flat ends 46 and 48 which extend normal to the axis of the bulb. However, when the lips formed by the bore 44 are inserted into the groove 42, the wall 48 is stretched and expanded as illustrated in FIGURE 6 so that the bulb had a generally tapered configuration. The outer end 46 being flat, permits the entire assembly to be supported on the bulb in a vertical position as illustrated in FIGURE 2. By placing the flat end 46 on the flat surface such as 50, the entire assembly will remain in a vertical self-standing position unassisted.

For sealing the chamber 20, an annular cap 52 of the same diameter as the sleeve 16 is employed. The cap 52 includes an annular extension or neck 54 having a threaded surface 56 thereon. By screwing the threads 56 of the cap into the threads 24 of the sleeve, the inner surface 58 of the cap can be brought into compressive sealing engagement with the sealing ring 28.

The inner end of the shaft 36 has a reduced circular portion 60 which has an elastic sleeve 62 snugly fitted thereover. The sleeve 62 has its lower end closed by a circular wall 64 which has an axial bore 66 therein in alignment with the bore 38 of the shaft 36. The wall 64 has its outer surface concave as shown at 68 and defining a cup adapted to fit the outer curved surface of any conventional contact lens. The outer end of the sleeve 62 is enlarged as at 72 and stretched over and sealed to the annular end flange 70 of the cap 52. This enlarged portion 72 is connected to the sleeve portion 62 by means of a bellows type diaphragm portion 74.

As shown particularly in FIGURES 6 and 8, the shaft 36 has integrally formed thereon two circular projections 76 and 78 which extend radially outward along a diametrical line from the central portion of the shaft.

A circular bore 80 extending axially through the center of the cap 52 has two diametrically opposite grooves 82 and 84 formed therein which extend in axial directions along the bottom of the extension 54 upwardly to the abutments 86 and 88 at the outer portion of the cap. The extensions or lugs 76 and 78 of the shaft 36 slidably fit within the grooves 84 and 82.

A coil spring 90 fits loosely around the shaft 36 and by abutting against the flange 40 and the end of the cap 52, urges the shaft 36 in a direction outwardly of the chamber 20. However, the engagement between the lugs 76 and 78 and the abutment 86 and 88 limit the movement of shaft 36 as shown in FIGURE 6.

When my invention is used as a storage and cleaning device for contact lenses, each of the chambers 20 and 22 will contain a small quantity of conventional lens bathing and cleaning fluid 92 and a contact lens 94 shown in FIGURE 3.

To remove the lens 94, the operator squeezes the side walls of the bulb 32 as shown in FIGURE 4, and at the same time pushes the bulb downwardly against the expansive force of spring 90 as to compress the same and at the sime time to urge the concave surface 68 of sleeve 62 into contact with the outer surface of the lens 94. The operator then slightly releases the compressive pressure on bulb 32 so that it may expand and create a partial vacuum or a suction in passageways 38 and 66 so as to suck the lens firmly in contact with the concave face 68. As shown in FIGURE 6, the diameter of the chamber for the fluid and lens is such as to prevent the lens from moving laterally out of alignment with the concave face 68.

The operator then unscrews the cap 52 from the end of the sleeve 16 and then lifts the entire lifting assembly with the lens 94 carried thereby by means of the bulb 32 being lightly pressed between his index finger 100 and thumb 102 as shown in FIGURE 2. The operator then places the lens 94 on his proper eye 104 as shown in FIGURE 5. To separate the lens from the sleeve 62, it is only necessary to slightly squeeze bulb 32 a little harder so as to destroy the suction therein. After the suction or partial vacuum is destroyed within the bulb 32 and passage 66, the lens 94 is forced off the concave end 64 of the sleeve 62 and remains in position on the eye 104. The sleeve 62 is then returned to its proper chamber and the cap 52 is screwed into the cylinder 16 in sealing relationship therewith as shown in FIGURE 1.

To remove the lens 94 from the eye 104, it is only necessary to remove the lifting assembly 10 from the sleeve 16, squeeze the bulb 32, place the concave surface 64 of the sleeve 62 adjacent the outer surface of lens 94 as shown in FIGURE 5, release the pressure on bulb 32 slightly so as to cause a suction at 66 for holding the lens in concave seat 68. The sleeve 66 may then be tilted slightly so as to break the suction between eye 104 and lens 94, and then the lens and lifting assembly is then returned to its position within the storage device 14 as illustrated in FIGURE 1.

The lens for the other eye is installed thereon and removed therefrom in exactly the same manner by the lifting assembly 12.

In removing the lens 94 from the storage device 14 it is preferable to unscrew cap 52 completely and then compress bulb 32 and push inwardly on shaft 36 for picking up the lens in cup 68. The shaft 36 may move a sufficient distance in relation to cap 32 to permit surface 68 to contact the lens even when the cap is fully unscrewed from sleeve 62.

The assembly 14, the cap 52, the shaft 36 are all preferably formed of a conventional plastic such as nylon, while the bulbs 32 and sealing rings 28 as well as the sleeves 32 and their attached portions 64, 74 and 72 are all composed of a flexible rubber-like material.

Concave surface 68 must be very smooth so as to properly fit the lens 92.

The foregoing is considered as illustrative only of the principles of the invention. Further, since numerous modifications and changes will readily occur to those skilled in the art it is not desired to limit the invention to the exact construction and operation shown and described, and accordingly all suitable modifications and equivalents may be resorted to, falling within the scope of the invention as claimed.

What is claimed as new is as follows:

1. A device for use in conjunction with contact lenses comprising a container for at least one lens having an opening therein for insertion and removal of said lens, a removable cap normally covering said opening and for sealing said container, a handling member having a concave surface adapted to fit the convex outer surface of said one lens for picking up same, means connecting said member to said cap, said connecting means embodying a shaft splined to said cap and extending slidingly therethrough, said shaft and member having aligned bores and a suction producing and releasing means connected to said bore.

2. A device as defined in claim 1 wherein said suction producing means comprises a hollow flexible bulb.

3. For use in temporarily storing and bathing a contact lens which is not, at the time, being used, a container having a receptacle portion adapted to contain a cleaning liquid in which the lens may be immersed, a cap removably mounted atop the container and providing a readily applicable and removable closure for the receptacle portion, a plunger comprising a shaft having a median portion slidingly keyed in an axial portion of said cap, said shaft having an inner end portion depending into the receptacle portion and having an outer end portion projecting outwardly beyond the cap, said shaft having an axial bore extending therethrough, and a suction cup mounted on the inner end portion of said shaft having an aperture communicating with the bore in said shaft and a manually squeezable flexibly resilient bulb mounted on the outer end of said shaft, the outer open end of the bore in said shaft communicating with the chamber in said bulb.

4. The structure defined in claim 3 and, in combination a head on the outer end of said shaft, a portion of said bulb being connected to said head, said head providing a stop shoulder, and a coil spring surrounding the outer projecting end portion of said shaft and interposed between the stop shoulder and an exterior surface of said cap.

5. In combination, a container comprising a sleeve provided interiorly with a divider, said divider defining open-ended wells and said wells constituting receptacle portions adapted to contain a bathing solution, a closing cap for each end of said sleeve, said cap being removably mounted and having an axial bore, a plunger having a median portion thereof slidingly keyed in the axial portion of said cap and having an inner end portion depending into the receptacle portion and an outer end portion projecting beyond the cap and provided with a shoulder, a coil spring encircling the outer end portion and engaging the shoulder and cap respectively, said shaft having an axial bore therethrough, a centrally apertured suction cup mounted on the inner end of the shaft in said receptacle portion, and a squeezable suction-type bulb operatively mounted on the outer end of said shaft with the outer end of the shaft in communication with the chamber portion of the bulb.

6. For use in applying, removing and in other ways handling a contact lens of a type which is in use by a wearer thereof, a manually usable applier comprising a shaft constituting a handle and having an axial bore opening through the respective ends of the shaft, a suction cup mounted operatively on the distal end of said shaft and having a centralized bore aligned and communicating with the bore in said shaft, and a flexibly resilient suction producing bulb mounted operatively on the proximal end of said shaft, the adjacent end of the bore in said shaft being in communication with the suction chamber in said bulb, said bulb being manually squeezable and releasable and enabling the user to apply the suction cup to the contact lens in a manner to lift the same from the eyeball of the user and alternatively to release the grip of the suction cup on the lens at will, and a lens bathing and storing container having a receptacle portion for a lens bathing fluid, said shaft having means thereon separably connectible with the container, said means constituting a closure for said receptacle portion.

7. For use in applying, removing and in other ways handling a contact lens of a type which is in use by a wearer thereof, a manually usable applier comprising a shaft constituting a handle and having an axial bore opening through the respective ends of the shaft, a suction cup mounted operatively on the distal end of said shaft and having a centralized bore aligned and communicating with the bore in said shaft, and a flexibly resilient suction producing bulb mounted operatively on the proximal end of said shaft, the adjacent end of the bore in said shaft being in communication with the suction chamber in said bulb, said bulb being manually squeezable and releasable and enabling the user to apply the suction cup to the contact lens in a manner to lift the same from the eyeball of the user and alternatively to release the grip of the suction cup on the lens at will, a lens bathing and storing container having a receptacle portion for a lens bathing fluid, said shaft having means thereon separably connectible with the container said means constituting a closure for said receptacle portion, said closure embodying a screwthreaded neck and constituting a cap, and the receptacle portion of the container having screw-threads to accommodate said screwthreaded neck.

References Cited in the file of this patent

UNITED STATES PATENTS

| | | |
|---|---|---|
| 672,148 | Green | Apr. 16, 1901 |
| 1,588,119 | Lowenbach | June 8, 1926 |
| 2,369,758 | Sheldon | Feb. 20, 1945 |
| 2,379,629 | Eweson | July 3, 1945 |
| 2,384,334 | Olson | Sept. 4, 1945 |
| 2,643,661 | Shanahan | June 30, 1953 |
| 2,919,696 | Rinaldy | Jan. 5, 1960 |
| 2,944,661 | Goldstein | July 12, 1960 |

FOREIGN PATENTS

| | | |
|---|---|---|
| 150,256 | Australia | Feb. 23, 1953 |